(12) United States Patent
You et al.

(10) Patent No.: US 7,817,028 B2
(45) Date of Patent: Oct. 19, 2010

(54) SYSTEM AND METHOD FOR DRIVING LED VEHICLE LIGHTS

(75) Inventors: Ju-Yuan You, Hsinchu (TW);
Chien-Feng Chang, Hsinchu (TW);
Zong-Huai Lee, Hsinchu (TW);
Chih-Hao Tseng, Hsinchu (TW)

(73) Assignee: Opto Tech Corp., Hsinchu (TW)

( * ) Notice: Subject to any disclaimer, the term of this patent is extended or adjusted under 35 U.S.C. 154(b) by 263 days.

(21) Appl. No.: 12/245,699

(22) Filed: Oct. 3, 2008

(65) Prior Publication Data
US 2010/0084978 A1 Apr. 8, 2010

(51) Int. Cl.
*B60Q 1/44* (2006.01)
(52) U.S. Cl. ..................................... 340/479
(58) Field of Classification Search ............... 340/479, 340/468, 465, 475, 458; 315/77
See application file for complete search history.

(56) References Cited

U.S. PATENT DOCUMENTS

| | | | | |
|---|---|---|---|---|
| 5,565,841 A * | 10/1996 | Pandohie | ............... | 340/479 |
| 7,075,423 B2 * | 7/2006 | Currie | ............... | 340/467 |
| 7,078,861 B2 * | 7/2006 | Masaoka | ............... | 315/82 |
| 7,199,704 B2 * | 4/2007 | Herrig et al. | ............... | 340/471 |
| 2002/0171543 A1 * | 11/2002 | Abbe et al. | ............... | 340/468 |
| 2002/0195947 A1 * | 12/2002 | Doczy et al. | ............... | 315/77 |
| 2009/0026958 A1 * | 1/2009 | Kitagawa et al. | ............... | 315/77 |

* cited by examiner

*Primary Examiner*—Phung Nguyen

(57) ABSTRACT

A system and method for driving LED vehicle lights is provided, for diving an LED taillight and brake light, an LED reversing light and an LED direction indicator. The system and method uses direction indicator controller to receive the direction indicator enabling signal generated by vehicle light power controller and generate an direction indicator control signal to an enabling switch controller to avoid the flasher frequency of the direction indicator from being affected by the lighted taillight and brake light and reversing light so as to provide the driving capability that can stabilize the flasher frequency of the direction indicator.

8 Claims, 5 Drawing Sheets

SYSTEM AND METHOD FOR DRIVING LED VEHICLE LIGHTS

FIELD OF THE INVENTION

The present invention generally relates to a system for driving vehicle lights, and more specifically to a system for driving LED vehicle lights

BACKGROUND OF THE INVENTION

The conventional vehicle lights use tungsten light bulbs because tungsten light bulbs are easy to drive and maintain. The common vehicle lights include headlight, taillight, brake light, reversing light, and direction indicator. Conventionally, the vehicle light driving system categorizes the headlights using large amount of watts into a class, and the taillight, brake light, reversing light and direction indicator that use small amount of watts into another class. The taillight, brake light and reversing light are simpler in operation as they only need to turn on and off following the driver's instruction. However, the operation of direction indicator may be more complicated. According to ECE regulation 6 of EU, the direction indicator requires to meet certain blinking frequency, which is about 1.5 Hz, defined by taking the human visual and psychological reaction into account.

FIG. 1 shows a schematic view of a conventional driving system for tungsten vehicle lights. As shown in FIG. 1, a driving system 1 for tungsten vehicle lights includes a power control PWRC 10, a voltage regulator RGR 20 and an enabling switch ENSW 40 to drive tungsten taillight and brake light (L1) 31, reversing light (L2) 32, direction indicator (L3) 33. PWRC 10 outputs taillight and brake light enabling signal SC1, reversing light enabling signal SC2 and direction indicator enabling signal SC3 to RGR 20 and ENSW 40. RGR 20 outputs vehicle light switch signal SR to taillight and brake light 31, reversing light 32 simultaneously, and direction indicator 33 receives direction indicator enabling signal SC3.

Based on SC1, SC2 and SC3, ENSW 40 controls taillight and brake light loop signal SL1, brake light loop signal SL2 and direction indicator loop signal SL3, which in turns control the ON/OFF of taillight and brake light 31, reversing light 32 and direction indicator 33. For example, based on SC1, ENSW 40 grounds taillight and brake light loop signal SL1 to light taillight and brake light 31. In addition, PWRC 10 includes a flasher FLR 12 for outputting SC3 to enable ENSW40 to light direction indicator 33 with flashing frequency of 90 times per minute.

Because the driving mechanism of taillight and brake light 31, reversing light 32 and direction indicator 33 separates the loads, this mechanism can prevent taillight and brake light 31, reversing light 32 and direction indicator 33 from interfering with each one another. However, as the tungsten light bulbs consume more energy and are less durable, the LEDs gain much popularity and are widely used in many vehicle lighting applications, such as taillight, direction indicator, reading light, dashboard, and so on. These different types of applications require different voltage regulator structures, and yet with the same requirements for the vehicle LED driving circuitry of high translation efficiency, low current consumption, and LED current regulation. It is even more imperative to devise a simple and inexpensive architecture to realize the compound LED vehicle light driving system.

FIG. 2 shows a schematic view of a conventional LED vehicle light driving system. As shown in FIG. 2, voltage regulator RGR 20 provides vehicle light switch signal SR to LED taillight and brake light 51, LED reversing light 52 and LED direction indicator 53 simultaneously so that, based on SC3, ENSW 40 controls LED direction indicator 53 to flasher at the frequency of 90 times per minute; which will interfere with LED taillight and brake light 51, and LED reversing light 52.

The flashing of direction indicator depends on the flashing control relay (not shown), and the flashing control relay includes a flashing time control loop and a impedance determination loop. When the load of the lighting device is lower than a predefined level, such as lighting device short-circuit due to malfunction, the flashing time control loop will flasher at an abnormal frequency, for example, faster than the 90 times per minutes, to remind the user of the malfunction and trouble-shooting or repairmen is required.

Furthermore, the impedance determination loop for determining whether the load is normal is based on the energy consumption of the lighting device. Assume that a direction indicator consumes 20 W, and the front direction indicator and the rear direction indicator consumes 40 W in total. The design of the flashing control relay is to determine whether the load of the front and the rear direction indicators is over 20 W. If the load is over 20 W, the flashing is at the normal frequency. Otherwise, if the load is lower than 20 W, the flashing is at an abnormal frequency. However, as the LED consumes very little energy, the flashing control relay will treat LED lighting device as low load loop, and cause the direction indicator to flasher at an abnormal frequency.

Another problem of the conventional LED vehicle light driving system is that a shared voltage regulator is used by different lighting device load to reduce the cost. The driving system of the shared voltage regulator will cause the interference problem between circuits. That is, the brake light function may be interfered by the direction indicator to flasher abnormally, or the direction indicator may be interfered by the brake light to stop the normal flashing.

In the conventional technology, the LED lighting device interference problem may be solved by changing the LED energy consumption. However, while the above approach is fast, simple and low modification cost, the advantage of low energy consumption of LED lighting device is lost. Another approach is to modify the charge/discharge loop of the flashing control relay. The advantage of this approach is that the flashing speed can resume normal, but eh disadvantage is that the approach takes more time as well as more expertise for the modification. If all the direction indicators use LED, the abnormal flashing is still possible. Yet another approach is to install flashing control relay design specifically for LED. The advantage is that no further modification is required, but the disadvantages include high cost, expertise in replacing the vehicle control system relay, and normal flashing even when the LED lighting device malfunctions; in other words, the abnormal flashing is no longer available to remind the user for repair. Another approach is to change the driving circuit of the shared voltage regulator into an independent area circuit to provide lighting device with different loads individually. FIG. 3 shows a schematic view of the LED vehicle light driving system of an independent voltage regulation system. As shown in FIG. 3, the LED vehicle light driving system include two voltage regulators 20, 22 so that voltage regulator 20 provides LED taillight and brake light 51 and LED reversing light 52, while voltage regulator 22 provides LED direction indicator 53. The advantage is that the modification to lighting device design is easy, but the disadvantage is that the cost of driving circuit for independent voltage regulators will increase.

Therefore, it is imperative to devise an LED vehicle driving system with a single voltage regulator with a simple structure so that, without increasing the cost, the LED lighting device can be applied to the design of compound vehicle light and remains compatible to the general flasher that can avoid abnormal flashing when in low load and avoid interference between different loads. In this manner, the lighting efficiency can be improved and the cost and energy consumption can be saved.

SUMMARY OF THE INVENTION

The primary object of the present invention is to provide a driving system for LED vehicle light, for lighting taillight and brake light, reversing light and direction indicator, by using a single voltage regulator with digital controller to determine direction indicator enabling signal to control the normal flashing of LED direction indicator while maintaining the normal operation of taillight and brake light, and reversing light and avoiding the interference.

Another object of the present invention is to provide a driving system for LED vehicle light, for lighting taillight and brake light, reversing light and direction indicator, by using digital controller to execute appropriate firmware to determine direction indicator enabling signal and monitor the brake light enabling status. When the direction indicator is enabled and the brake light is not enabled, the direction indicator enabling signal of the flasher is directly transmitted to the enabling switch controller so that the direction indicator can flasher according to the direction indicator enabling signal, and when the direction indicator is enabled and the brake light is also enabled, an oscillation signal is generated for the enabling switch controller so that the direction indicator can flasher according to the oscillation signal to avoid the interference.

The main advantage of the present invention is to exclude the heat incurred by the additional energy consumption of the conventional technology, such as, the temperature raise due to the enclosed structure further lowering luminance efficiency of LED and shortening the lifespan of the LEDs.

Another advantage of the present invention is to improve the design flexibility of the LED application to the vehicle light system, as well as reduce the re-installation cost by allowing only replacing parts.

Yet another advantage of the present invention is to integrate the determination method of direction indicator enabling signal into the LED vehicle light, i.e., the digital direction indicator controller, so that the user does not require professional expertise or additional parts for replacement. This reduces the cost of the product and improves the market competitive edge.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
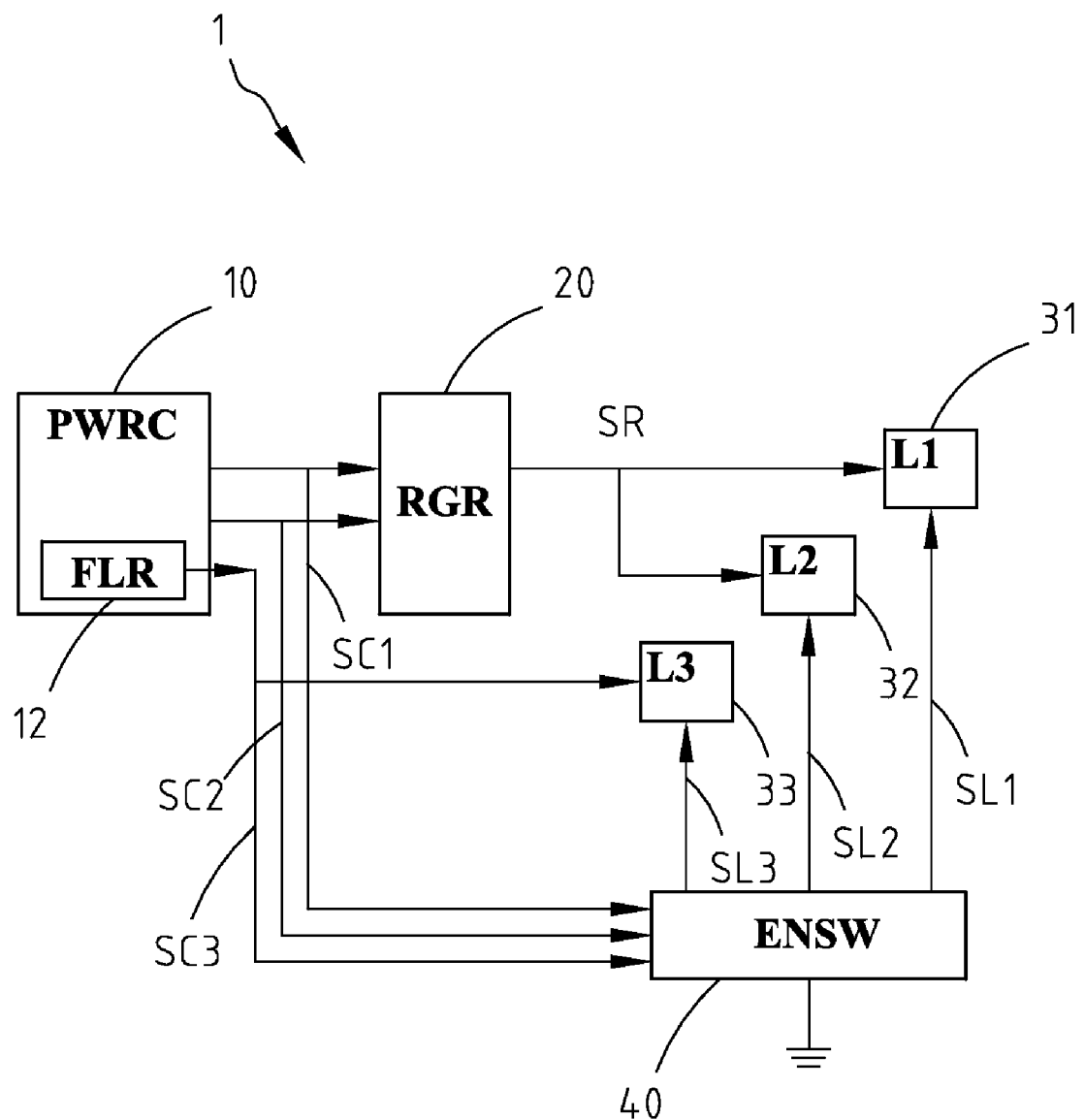
FIG. 1 shows a schematic view of a conventional driving system for tungsten vehicle light.
Figure 2:
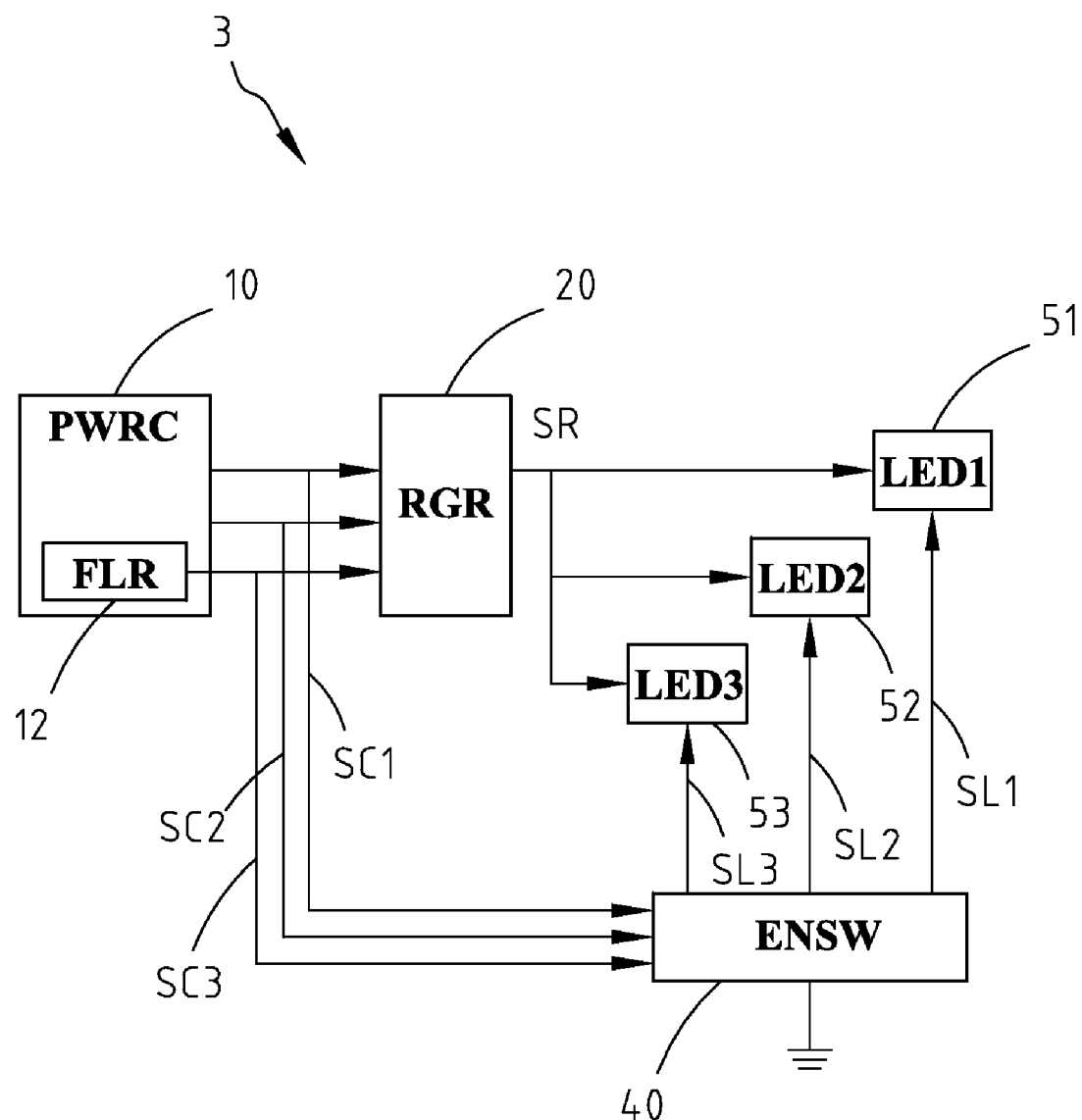
FIG. 2 shows a schematic view of a conventional driving system for LED vehicle light.
Figure 3:
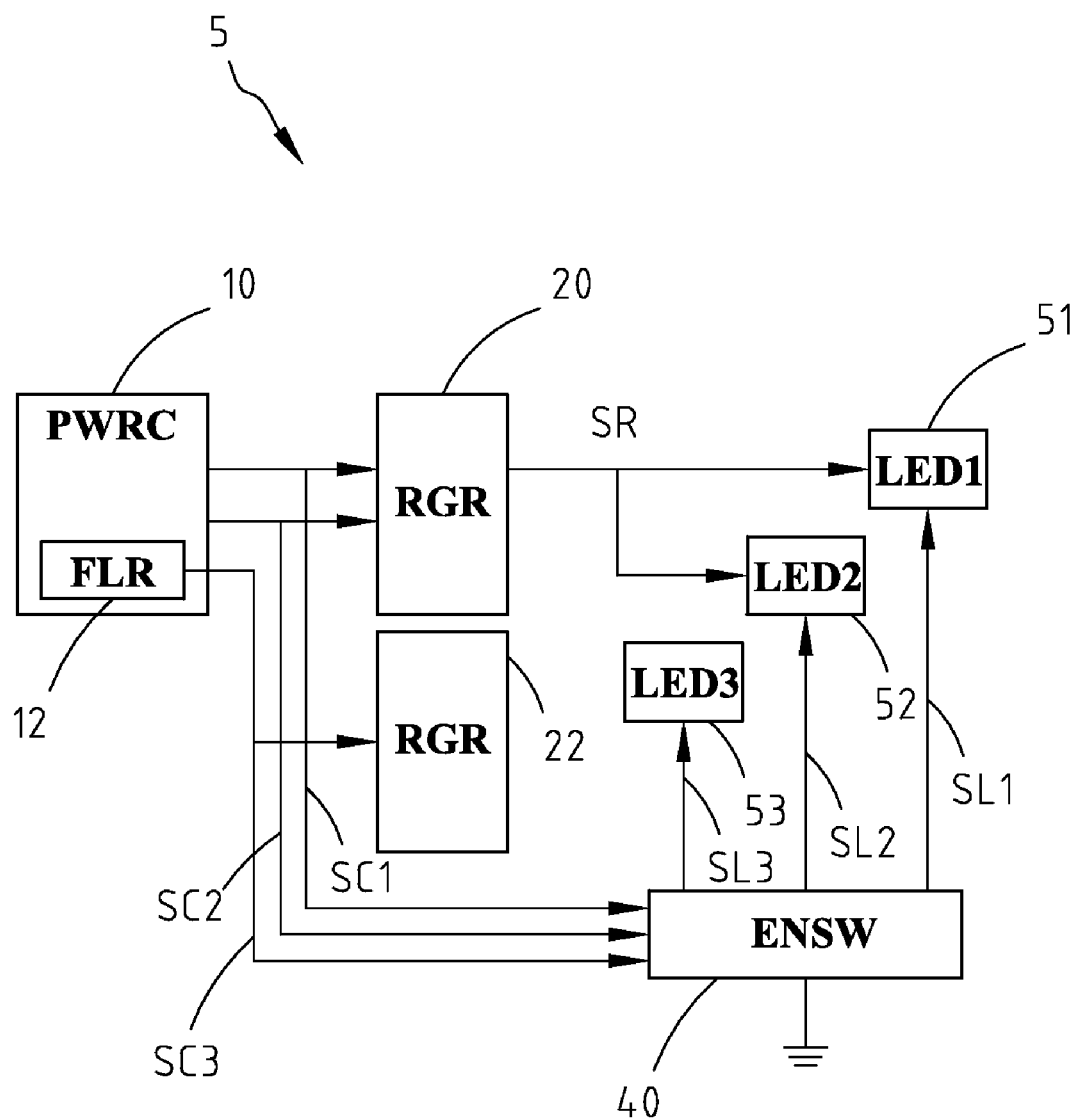
FIG. 3 shows a schematic view of a conventional LED vehicle light driving system of independent voltage regulation system.
Figure 4:
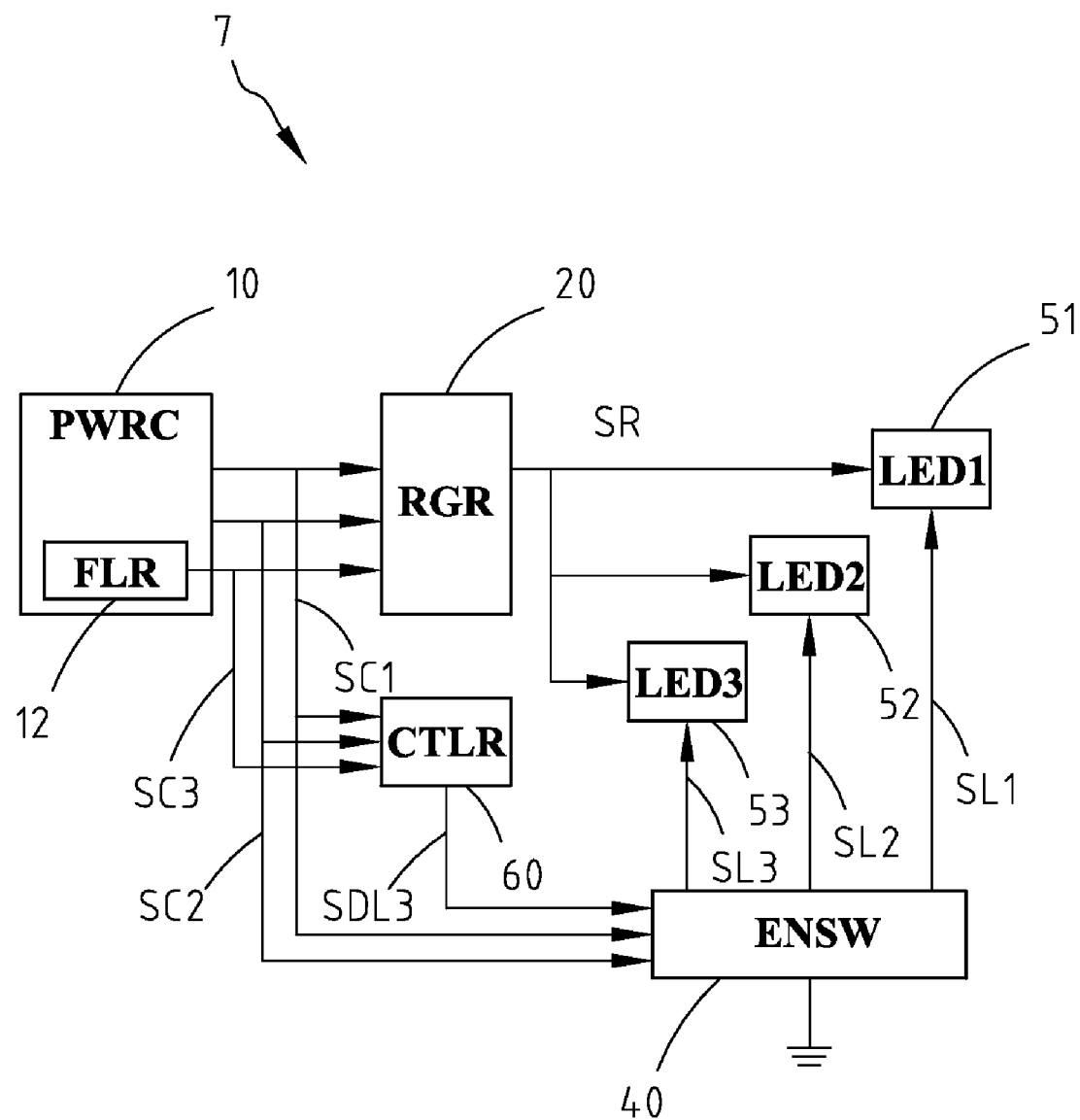
FIG. 4 shows a schematic view of a driving system for LED vehicle light according to the present invention.

FIG. 4 shows a schematic view of a driving system for LED vehicle light according to the present invention. Driving system 7 for LED vehicle light of the present invention includes a vehicle light power controller 10 (PWRC), a voltage regulator 20, an enabling switch controller (ENSW) 40 and a direction indicator controller 60 for lighting LED taillight and brake light 51, LED reversing light 52 and LED direction indicator 53, where PWRC 10 includes flasher 12 for outputting direction indicator enabling signal SC3 to voltage regulator 20 and direction indicator controller 60. PWRC 10 also outputs taillight and brake light enabling signal SC1 and reversing light enabling signal SC2 to voltage regulator 20, ENSW 40 and direction indicator controller 60 simultaneously. Direction indicator controller 60 uses SC1 and SC2 to determine whether LED taillight and brake light 51 and LED reversing light 52 are enabled and determine direction indicator control signal SDL3 for transmission to ENSW 40. When LED taillight and brake light 51 or LED reversing light 52 is not enabled, direction indicator controller 60 directly sends SC3 to SDL3, i.e., uses SC3 to light LED direction indicator 53. When LED taillight and brake light 51 or LED reversing light 52 is enabled, direction indicator controller 60 generates an oscillation signal as SDL3, i.e., disregards SC3 and uses the oscillation signal to light LED direction indicator 53. In this manner, the interference from LED taillight and brake light 51 or LED reversing light 52 on LED direction indicator 53 is avoided. Based on SC1, SC2 and SDL3, ENSW 40 controls taillight and brake light loop signal SL1, reversing light loop signal SL2 and direction indicator loop signal SL3 in the manner similar to the conventional technology; thus, the description is omitted here.

Figure 5:
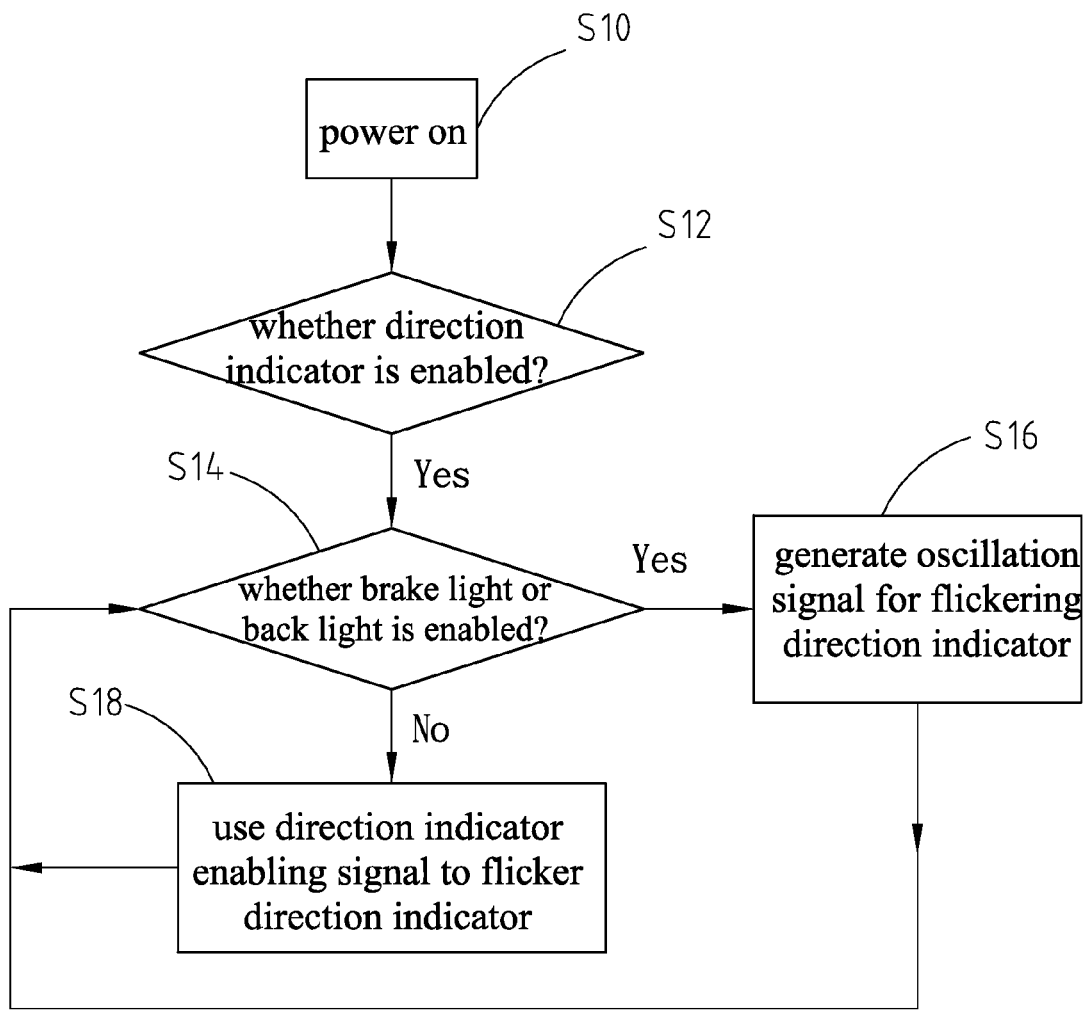
FIG. 5 shows a flowchart of a driving method for LED vehicle light according to the present invention.

FIG. 5 shows a flowchart of the driving method for LED vehicle light according to the present invention. Step S10 is to switch on the system power and start the process. Step S12 is to determine whether LED direction indicator is enabled according to the SC3. If not enabled, wait until LED direction indicator 53 is enabled. When enabled, enter step S14. Step S14 is to determine whether the brake light or the reversing light is enabled according to SC1 and SC2. If brake light or reversing light is enabled, enter step S16; otherwise, enter step S18. Step S16 is for direction indicator controller 60 to generate an oscillation signal as SDL3 to flasher the direction indicator and then return to step S12 to wait for LED direction indicator to be enabled. Step S18 is to use Sc3 directly as SDL3 and return to step S12 to wait for LED direction indicator to be enabled. Therefore, only when the direction indicator is enabled, LED direction indicator 53 is directly lighted up by SC3; otherwise, LED direction indicator 53 is lighted up by the oscillation signal generated by direction indicator controller 60. In addition, in the driving method for LED vehicle light of the present invention, the lighting of LED taillight and brake light 51 and LED reversing light 52 is the same as in the conventional technology, thus, the description is omitted here.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A system for driving LED vehicle lights, for lighting an LED taillight and brake light, an LED reversing light and an LED direction indicator, said system comprising:
   a vehicle light power controller, for generating a taillight and brake light enabling signal, a reversing light enabling signal and a direction indicator enabling signal;
   a voltage regulator, for receiving said taillight and brake light enabling signal, said reversing light enabling signal and said direction indicator enabling signal and outputting a vehicle light ON/OFF signal to said LED taillight and brake light, said LED reversing light and said LED direction indicator,;
   a direction indicator controller, for receiving said taillight and brake light enabling signal, said reversing light enabling signal and said direction indicator enabling signal and generating a direction indicator control signal based on an appropriate determination means; and
   an enabling switch controller, for receiving said taillight and brake light enabling signal, said reversing light enabling signal and said direction indicator enabling signal to control a taillight and brake light loop signal, a reversing light loop signal and a direction indicator loop signal connected respectively to said LED taillight and brake light, said LED reversing light and said LED direction indicator for lighting up said LED taillight and brake light, said LED reversing light and said LED direction indicator respectively.

2. The system as claimed in claim 1, wherein said appropriate determination means comprises the following: when only said LED direction indicator is enabled, said direction indicator enabling signal is used as said direction indicator control signal; when said LED direction indicator is enabled and one of said LED taillight and brake light and said reversing light is also enabled, said direction indicator controller generates an oscillation signal and said oscillation signal is used as said direction indicator control signal.

3. The system as claimed in claim 2, wherein said oscillation signal has a default frequency, and said default frequency is 90 times per minute.

4. The system as claimed in claim 1, wherein said vehicle light power controller comprises a flasher for generating said direction indicator enabling signal.

5. The system as claimed in claim 1, wherein said direction indicator enabling signal has a default frequency, and said default frequency is 90 times per minute.

6. A method for driving LED vehicle lights, for lighting an LED taillight and brake light, an LED reversing light and an LED direction indicator, said method comprising the steps of:
   step A: switching on a system power and entering step B;
   step B: detecting whether said LED direction being enabled; if so, entering step C; otherwise, staying in step B;
   step C: detecting whether either said LED taillight and brake light or said reversing light being enabled; if so, entering step D; otherwise, entering step E;
   step D: a direction indicator controller generating an oscillation signal for lighting up said LED direction indicator, and entering step B; and
   step E: said direction indicator controller using a direction indicator enabling signal generated by a flasher of a vehicle light power controller to generate a direction indicator control signal and light up said LED direction indicator, and entering step B;
   wherein the cathodes of said LED taillight and brake light, said LED reversing light and said LED direction indicator being all connected to a vehicle light ON/OFF signal of a voltage regulator, the anodes of said LED taillight and brake light, said LED reversing light and said LED direction indicator being connected respectively to a taillight and brake light loop signal, a reversing light loop signal and a direction indicator loop signal from an enabling switch controller, said voltage regulator receiving a taillight and brake light enabling signal, a reversing light enabling signal and a direction indicator enabling signal from said vehicle light power controller and outputting said vehicle light ON/OFF signal, said direction indicator controller receiving said taillight and brake light enabling signal, said reversing light enabling signal and said direction indicator enabling signal and using said steps of A-E to generate said direction indicator control signal, said enabling switch controller receiving said taillight and brake light enabling signal, said reversing light enabling signal and said direction indicator enabling signal to generate said taillight and brake light loop signal, said reversing light loop signal and said direction indicator loop signal for lighting up said LED taillight and brake light, said LED reversing light and said LED direction indicator respectively.

7. The method as claimed in claim 6, wherein said oscillation signal has a default frequency, and said default frequency is 90 times per minute.

8. The method as claimed in claim 6, wherein said direction indicator enabling signal has a default frequency, and said default frequency is 90 times per minute.

* * * * *